Patented Jan. 15, 1935

1,988,222

UNITED STATES PATENT OFFICE 1,988,222

MANUFACTURE OF β-IODO-HYDROXY-NAPHTHALENEDISULPHONIC ACIDS

Arthur Stoll, August Binkert, and Walter Kussmaul, Basel, Switzerland, assignors to Chemical Works formerly Sandoz, Basel, Switzerland No Drawing. Application September 24, 1934, Serial No. 745,364. In Switzerland October 4, 1933

8 Claims. (Cl. 260—155)

In the U. S. Specification No. 1,946,950 a process has been described, which allows the preparation of 1-iodo-8-hydroxynaphthalenesulphonic acids.

It has now been found that therapeutically valuable β-iodo-hydroxynaphthalenedisulphonic acids can be prepared by a similar process, that is by substituting iodine for the diazo group in the respective β-diazo-hydroxynaphthalenedisulphonic acids. The process for the manufacture of the new compounds can for example be carried out by heating the diazo compounds with hydroiodic acid. Sometimes it may be preferable to decompose the diazonium iodide by means of copper, but other suitable processes may also be used. The new compounds may be isolated from their solutions by salting them out or by concentrating the solution, whereby the new iodine derivatives precipitate.

The new β-iodo-hydroxynaphthalenedisulphonic acids are generally slightly colored compounds, easily soluble in water, yielding stable solutions. They can easily be recrystallized and can, therefore, be obtained in a very pure form. They can be used for therapeutical purposes and for the manufacture of therapeutical preparations.

The following examples, without being limitative, illustrate the present process, the parts being by weight:

Example 1

200 parts of 2,8,3,6-aminonaphtholdisulphonic acid are dissolved in 1250 parts of ice-water in presence of 275 parts of sodium hydroxide solution 2-n, and precipitated by means of an addition of 250 parts of hydrochloric acid 10-n. The obtained fine suspension is then diazotized by means of an addition of 36 parts of sodium nitrite dissolved in 100 parts of water. The diazo compound obtained is filtered, suspended in 450 parts of hydroiodic acid of about 18% and heated. At 65° C. the nitrogen begins to evolve and the solution becomes clear. On cooling down the 2-iodo-8-hydroxynaphthalene-3,6-disulphonic acid precipitates in form of colorless crystals.

The disodium salt of 2-iodo-8-hydroxynaphthalene-3,6-disulphonic acid is easily soluble in water and contains 26.88% of I and 9.51% of Na (the theoretical content for $C_{10}H_5O_7S_2Na_2I$ mol. weight 474.1 is of 26.77% of I and 9.70% of Na).

Instead of hydroiodic acid, it is also possible to use its suitable salts. The present process can then be carried out for example in the following manner:

To the strong acid suspension of the diazo compound is added an appropriate amount of potassium or sodium iodide, whereby hydroiodic acid is formed and reacts with the diazo compound.

Instead of the above said naphtholdisulphonic acid, also 1-hydroxy-2-amino-4,6-naphthalenedisulphonic acid or 1-hydroxy-2-amino-3,6-naphthalenedisulphonic acid can be used.

Example 2

The filtrated diazonium salt prepared from 36 parts of 2-amino-3-hydroxynaphthalene-6,8-disulphonic acid is suspended in 60 parts of hydroiodic acid (of about 25%) and the suspension heated up to 50° C. After the nitrogen has evolved, about 90 parts of a saturated sodium chloride solution are added to the reaction mixture, and the new product begins to crystallize out in reddish needles.

The disodium salt of the 2-iodo-3-hydroxynaphthalene-6,8-disulphonic acid obtained in this manner is easily soluble in water, yielding stable solutions, and contains 26.53% of I and 9.52% of Na.

In order to accelerate the evolution of the nitrogen and to activate the decomposition of the diazo-compound at a lower temperature, it may be indicated to add a small amount of copper, such as copper bronze. The addition of copper allows to prepare these compounds at a much lower temperature and within a shorter time.

What we claim is:—

1. A process for the manufacture of β-iodo-hydroxynaphthalenedisulphonic acids, consisting in heating in an aqueous medium the diazonium iodides of β-diazohydroxynaphthalenedisulphonic acids.

2. A process for the manufacture of β-iodo-hydroxynaphthalenedisulphonic acids, consisting in heating in an aqueous medium the diazonium iodides of β-diazohydroxynaphthalenedisulphonic acids in presence of copper.

3. A process for the manufacture of β-iodohydroxynaphthalenedisulphonic acids, consisting in heating in an aqueous medium the diazonium iodides of β-diazohydroxynaphthalenedisulphonic acids in presence of copper bronze.

4. A process for the manufacture of 2-iodo-8-hydroxynaphthalene-3,6-disulphonic acid, consisting in heating in an aqueous medium the diazonium iodide of 2-diazo-8-hydroxynaphthalene-3,6-disulphonic acid.

5. A process for the manufacture of 2-iodo-3-hydroxynaphthalene-6,8-disulphonic acid, consisting in heating in an aqueous medium the diazonium iodide of 2-diazo-3-hydroxynaphthalene-3,6-disulphonic acid.

6. The β-iodohydroxynaphthalenedisulphonic acids, which are in the dry state slightly colored compounds, that are soluble in water and usable for therapeutical purposes and as intermediates for the manufacture of therapeutical products.

7. The compound of the formula:

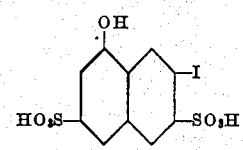

8. The compound of the formula:

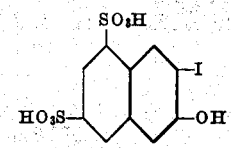

ARTHUR STOLL.
AUGUST BINKERT.
WALTER KUSSMAUL.